US010415692B2

(12) United States Patent
Lapeyre et al.

(10) Patent No.: US 10,415,692 B2
(45) Date of Patent: Sep. 17, 2019

(54) EMERGENCY LUBRICATION DEVICE OF SIMPLIFIED ARCHITECTURE FOR A POWER TRANSMISSION MAIN GEARBOX OF AN AIRCRAFT (71) Applicant: AIRBUS HELICOPTERS, Marignane (FR)

(72) Inventors: Jean-Victor Lapeyre, Lancon-de-Provence (FR); Gilles Eymard-Duvernay, Marignane (FR)

(73) Assignee: AIRBUS HELICOPTERS, Marignane (FR)

( * ) Notice: Subject to any disclaimer, the term of this patent is extended or adjusted under 35 U.S.C. 154(b) by 285 days.

(21) Appl. No.: 15/372,634

(22) Filed: Dec. 8, 2016

(65) Prior Publication Data
US 2017/0175875 A1 Jun. 22, 2017

(30) Foreign Application Priority Data

Dec. 17, 2015 (FR) ...................... 1502623

(51) Int. Cl.
F16H 57/04 (2010.01)
F16N 21/00 (2006.01)
(Continued)

(52) U.S. Cl.
CPC ......... *F16H 57/0442* (2013.01); *F01D 25/18* (2013.01); *F01D 25/20* (2013.01);
(Continued)

(58) Field of Classification Search
CPC .. F16H 57/0442; F16H 57/02; F16H 57/0435; F16H 57/0436; F16H 57/45;
(Continued)

(56) References Cited

U.S. PATENT DOCUMENTS 5,121,815 A * 6/1992 Francois ................. B64C 27/12
184/6.12
5,176,174 A * 1/1993 Toraason ................. G05D 9/02
137/590

(Continued)

FOREIGN PATENT DOCUMENTS

EP 2505878 10/2012
FR 2685758 7/1993
(Continued)

OTHER PUBLICATIONS

French Search Report for French Application No. FR 1502623, Completed by the French Patent Office, dated Aug. 8, 2016, 5 Pages.

*Primary Examiner* — Michael R Mansen
*Assistant Examiner* — Robert T Reese
(74) *Attorney, Agent, or Firm* — Brooks Kushman P.C.

(57) ABSTRACT

An emergency lubrication device of simplified architecture for a mechanical system. The emergency lubrication device has a tank, trigger means, at least one pipe, and at least one distribution means. The tank contains a lubrication liquid and it is arranged inside the mechanical system and above the pipes and the distribution means. Each distribution means includes at least one constriction means for limiting the flow rate of the lubrication liquid. The lubrication liquid is heated by the mechanical system, and the viscosity of the lubrication liquid decreases so that the flow rate of the lubrication liquid through each distribution means is substantially equal to or greater than a minimum flow rate so long as the tank contains the lubrication liquid.

20 Claims, 1 Drawing Sheet (51) Int. Cl.
*F16H 57/02* (2012.01)
*F16N 29/02* (2006.01)
*F16N 39/04* (2006.01)
*F16N 7/02* (2006.01)
*F16N 25/00* (2006.01)
*F01D 25/18* (2006.01)
*F01D 25/20* (2006.01)

(52) U.S. Cl.
CPC ........... *F16H 57/02* (2013.01); *F16H 57/045* (2013.01); *F16H 57/0435* (2013.01); *F16H 57/0436* (2013.01); *F16H 57/0456* (2013.01); *F16N 7/02* (2013.01); *F16N 21/00* (2013.01); *F16N 25/00* (2013.01); *F16N 29/02* (2013.01); *F16N 39/04* (2013.01); *F05D 2260/98* (2013.01); *F16N 2200/12* (2013.01); *F16N 2210/08* (2013.01); *F16N 2260/24* (2013.01); *F16N 2270/56* (2013.01); *F16N 2280/00* (2013.01)

(58) Field of Classification Search
CPC ........ F16H 57/0456; F16N 7/02; F16N 21/00; F16N 25/00; F16N 29/02; F16N 39/04; F16N 2260/98; F16N 2200/12; F16N 2210/08; F16N 2260/24; F16N 2270/56; F16N 2280/00; F01D 25/18; F01D 25/20
See application file for complete search history.

(56) References Cited

U.S. PATENT DOCUMENTS

| 6,793,042 | B2* | 9/2004 | Brouillet | F01D 25/18 184/103.1 |
| 7,500,542 | B2 | 3/2009 | Maret et al. | |
| 8,230,835 | B2 | 7/2012 | Gibson et al. | |
| 8,459,413 | B2* | 6/2013 | Gmirya | B64C 27/12 184/6.22 |
| 8,651,240 | B1* | 2/2014 | Motto | F01D 25/18 184/7.4 |
| 9,458,923 | B2* | 10/2016 | Poster | F16H 57/027 |
| 2007/0261922 | A1 | 11/2007 | Mullen et al. | |
| 2010/0101442 | A1* | 4/2010 | Gauthier | B60R 21/26 102/356 |

FOREIGN PATENT DOCUMENTS

FR 2826094 12/2002
WO 2008091341 7/2008

* cited by examiner

EMERGENCY LUBRICATION DEVICE OF SIMPLIFIED ARCHITECTURE FOR A POWER TRANSMISSION MAIN GEARBOX OF AN AIRCRAFT

CROSS REFERENCE TO RELATED APPLICATION

This application claims priority to French patent application No. FR 15 02623 filed on Dec. 17, 2015, the disclosure of which is incorporated in its entirety by reference herein.

BACKGROUND OF THE INVENTION (1) Field of the Invention

The present invention relates to the field of emergency lubrication for transmission gearboxes, in particular power transmission main gearboxes for a rotary wing aircraft.

The present invention relates to an emergency lubrication device of simplified architecture for a mechanical system. The emergency lubrication device is particularly adapted to lubricating a power transmission main gearbox of a rotary wing aircraft.

(2) Description of Related Art

A mechanical system generally includes rotary elements, such as shafts and bearings, together with power transmission elements and speed increasing or decreasing elements, such as pinions and/or gears. It is then essential for proper operation of the mechanical system to lubricate and cool these elements, e.g. with oil. The lubrication is generally provided by a lubrication circuit and its main functions are to limit wear and heating of these elements of the mechanical system and consequently to lengthen its lifetime. Without such lubrication, the operation of the mechanical system can rapidly become degraded, or even impossible.

As a result of the mechanical system being lubricated, the oil flowing in the lubrication circuit can sometimes become very hot and it is then cooled in a cooling circuit that is generally outside the mechanical system prior to being usable once more for lubricating the mechanical system. The cooling circuit includes a heat exchanger, e.g. an oil/air heat exchanger.

The cooling circuit outside the mechanical system constitutes a vulnerable portion of a lubrication circuit of the mechanical system when it comes to leaks. The cooling circuit has pipes, numerous connections, and the heat exchanger. The cooling circuit is then subjected to thermal stresses, such as a large temperature difference between the temperature of the oil and the outside temperature, and to vibratory stresses generated by the mechanical system and/or a vehicle using the mechanical system. Furthermore, the cooling circuit is arranged outside the mechanical system. In particular, when the mechanical system forms part of an aircraft, the cooling circuit is situated outside the mechanical system of the aircraft, e.g. under a cover. Nevertheless, it can be exposed to impacts against birds or indeed ice, for example. As a result, one or more leaks may appear in the couplings and the pipes and also in the heat exchanger, which leaks are caused essentially by these vibratory and thermal stresses.

Such leaks generally allow the mechanical system to continue to be lubricated, but for a duration that is limited. Specifically, it can happen that all of the oil stored in the lubrication circuit, e.g. in a tank, becomes discharged to the outside of the lubrication circuit via such leaks. Such leaks may possibly be detected by a drop in the pressure of the oil in the lubrication circuit.

Furthermore, a lubrication circuit also has a pressure generator, such as a pump, for feeding the lubrication circuit with oil, and thus enabling the oil to flow through the lubrication circuit. In the event of the pressure generator failing, the flow of oil is interrupted, and consequently the lubrication of the mechanical system is likewise interrupted immediately.

In the event of this lubrication being lost, damage can therefore appear rapidly in the operation of the mechanical system. By way of example, the consequence of such damage taking place in a mechanical system forming part of a motor vehicle, may be the vehicle coming to a stop immediately, or else coming to a stop after the oil in the lubrication circuit has been consumed.

In contrast, if the mechanical system is a power transmission main gearbox of a rotary wing aircraft, such damage to the lubrication circuit of the power transmission main gearbox can then have consequences that are catastrophic, such as an emergency landing or indeed a crash of the aircraft.

In order to mitigate such consequences, a mechanical system may include an emergency lubrication circuit. In the event of the main lubrication circuit being out of operation, such an emergency lubrication circuit makes it possible to provide lubrication, at least for essential members of the mechanical system, in order to ensure that the mechanical system continues to operate. For safety reasons, it is then preferable for the aircraft to operate at reduced power in order to limit stresses on the mechanical system. The emergency lubrication circuit thus makes it possible, e.g. when the mechanical system is a power transmission main gearbox of an aircraft, for the mechanical system to continue to operate, and consequently for the aircraft to continue to operate, in order to reach a landing site. Such an emergency lubrication circuit thus improves the safety of the aircraft.

An emergency lubrication circuit may be arranged in parallel with a main lubrication circuit, as described in Document U.S. Pat. No. 8,230,835. Each lubrication circuit then has its own pump, but uses the same oil tank. Nevertheless, although that emergency circuit enables a mechanical system to be lubricated sufficiently in the event of a failure of the main circuit, it is in fact used only rarely. As a result, the emergency circuit constitutes an on-board weight that is rarely used.

The emergency lubrication circuit may also have a tank that is independent from the main lubrication circuit, as described in Document FR 2 826 094. Furthermore, in that Document FR 2 826 094, the lubrication system includes a source of gas under pressure capable firstly of pressurizing the lubrication liquid contained in the tank, and secondly of causing the lubrication liquid to be sprayed in the form of a mist.

Furthermore, the zones where leaks appear in the main lubrication circuit are frequently to be found in the heat exchanger and its couplings. As a result, in order to avoid such leaks also appearing in the emergency lubrication circuit, the emergency circuit does not have a heat exchanger. As a result, the oil flowing due to the emergency circuit is then not cooled. Consequently, the emergency lubrication circuit can be used for only a limited duration in order to avoid the oil reaching a temperature that is too high.

That emergency circuit is generally put into operation automatically as a result of detecting a loss of pressure in the main circuit as a result of a failure of the pump of the main circuit or indeed as a result of a leak from the main circuit. The emergency lubrication circuit may also be put into operation manually by an operator.

In order to reduce any risk of a failure in the main lubrication circuit coming from the emergency circuit, the emergency circuit is generally provided with a bypass system for the purpose of shutting off flow in the pipes of the emergency system so long as there is sufficient oil pressure in the main lubrication circuit. Thus, in the event of a leak in the emergency lubrication system, the emergency system is no longer operational, but it does not impede operation of the main lubrication circuit.

The drawback of the bypass system is that it leaves open the possibility of a dormant (hidden) failure in the emergency circuit, with this failure being detected only at the moment when the emergency circuit is put into operation. Under such circumstances, this is a major anomaly that might be mission critical on a rotary wing aircraft.

For certain applications of rotary wing aircraft, the power transmission main gearbox does not have an emergency lubrication circuit properly speaking, but rather two lubrication circuits that are identical and independent. Each lubrication circuit has its own pump and its own heat exchanger. Nevertheless, those two circuits both use the same oil tank in common, which is constituted by the casing of the power transmission main gearbox. As a result, in the event of a leak from either of the lubrication circuits, the casing of the power transmission main gearbox will sooner or later become empty and lead to a failure of the complete lubrication system.

Some lubrication systems have an emergency tank, sometimes mounted directly inside the mechanical system for lubricating, as described in Documents EP 2 505 878 and US 2007/0261922. The emergency tank is located above members that it is essential to lubricate and that are fed permanently by the lubrication circuit. Oil then flows under gravity and continuously from the emergency tank to such essential members. Specifically, in the event of a failure of the lubrication circuit, the emergency tank is no longer fed, but it serves to lubricate such essential members for a limited time that corresponds to consuming the oil contained in the emergency tank.

Furthermore, according to Document US 2007/0261922, an additive may be added to the oil in the emergency tank after detecting a failure of the main lubrication circuit. The additive serves to enhance the characteristics of the oil so as to improve its effectiveness and the duration for which the emergency lubrication circuit constituted by the emergency tank can operate.

In addition, the device described in Document FR 2 685 758 also has an emergency tank feeding an oil distribution system via tubing. The emergency tank may be pressurized and opening a valve allows oil to flow in the tubing. It is also possible for the emergency tank to not be pressurized, with the tubing being fed via a pump. The emergency tank can thus be positioned without any particular constraint relative to the essential members that are to be lubricated. In the event of a failure of the main lubrication circuit, the valve is opened or the pump is started, either manually or automatically, depending on a threshold pressure value or on the temperature of the oil. The essential members are lubricated for a limited time corresponding to consuming the oil contained in the emergency tank.

Furthermore, Document WO 2008/091341 describes a lubrication device having an external circuit serving solely for cooling oil and an internal circuit serving for lubricating rotary elements of the mechanical system. In the event of detecting a leak and a drop in the level of lubrication liquid in the casing, air inside the casing is expelled to outside the casing in order to create suction inside the casing, thereby limiting the flow rate of the leak. The internal circuit can then continue to lubricate the rotary elements for a limited length of time, so long as the casing contains lubrication liquid.

BRIEF SUMMARY OF THE INVENTION

An object of the present invention is thus to propose an emergency lubrication device for a mechanical system that makes it possible to overcome the above-mentioned limitations, enabling essential members of the mechanical system to be lubricated in spite of the presence of a fault in the main lubrication circuit for some guaranteed minimum limited duration. The present invention also seeks to simplify the architecture of the emergency lubrication device in order to improve its reliability, while also reducing its weight and its cost.

According to the invention, the emergency lubrication device of simplified architecture for lubricating a mechanical system has a tank, trigger means, and at least one pipe and at least one distribution means. The tank contains a lubrication liquid, and the trigger means enable the lubrication liquid to flow between the tank and each distribution means in the event of a malfunction of main lubrication means of the mechanical system being detected.

By way of example, the mechanical system may be a power transmission main gearbox of a rotary wing aircraft.

By way of example, the mechanical system includes rotary elements and power transmission elements together with speed reducing or increasing elements that need to be lubricated and cooled by a lubrication liquid such as oil in order to enable the mechanical system to operate effectively and lastingly. For this purpose, the mechanical system has at least one main lubrication means serving to lubricate the rotary elements and the transmission elements. In conventional manner, each main lubrication means may include a heat exchanger in order to cool the lubrication liquid.

For simplification purposes, it is assumed that the mechanical system has only one main lubrication means. In the event of the main lubrication means failing or malfunctioning, the emergency lubrication device of the invention serves to lubricate at least the essential members of the mechanical system in order to ensure that the mechanical system continues to operate for some limited minimum duration, of the order of thirty minutes to two hours. Each distribution means is then arranged inside the mechanical system in order to lubricate at least the essential members.

The trigger means serve to put the emergency lubrication device into operation when a failure or a malfunction of the main lubrication means is detected. Such a failure and/or malfunction may be detected in various ways. For example, a drop in the pressure of the lubrication liquid in the main lubrication means or indeed a drop in the level of the lubrication liquid in a tank of the main lubrication means may be detected. An increase in the temperature of the mechanical system resulting from an interruption in the lubrication of the mechanical system may also be detected.

The emergency lubrication device of the invention is remarkable in that the tank is arranged above the pipes and the distribution means so that the lubrication liquid flows under the action of terrestrial gravity from the tank into each pipe and each distribution means. The emergency lubrication device is also remarkable in that each distribution means includes at least one constriction means in order to limit the flow rate of the lubrication liquid through each distribution means, and is arranged inside the mechanical system, each pipe feeding each distribution means also being arranged at least in part inside the mechanical system. The lubrication liquid flowing in each pipe and in each distribution means is thus heated by the mechanical system following a malfunction of the main lubrication means of the mechanical system, and consequently the viscosity of the lubrication liquid decreases so that a flow rate of the lubrication liquid through each distribution means is substantially equal to or greater than a minimum flow rate so long as the tank contains the lubrication liquid.

Advantageously, the tank positioned above the pipes and the distribution means enables the emergency lubrication device of the invention to operate without using any pressure generator. Specifically, the action of terrestrial gravity on its own enables the lubrication liquid to flow from the tank to each pipe and then to each distribution means.

Pressure may be generated in a main emergency lubrication device or in an emergency lubrication device in conventional manner by using a pump, or indeed by using a tank that is pressurized.

The absence of such a pressure generation advantageously eliminates using a mechanical component that might itself malfunction or fail, and thus eliminates a potential cause of malfunction for the emergency lubrication device. The reliability of the emergency lubrication device of the invention is thereby improved. Furthermore, the weight of the emergency lubrication device of the invention is also reduced by this absence of any pressure generator, and likewise its cost is reduced.

Furthermore, each distribution means includes at least one constriction means. Constriction means comprise reducing the dimensions of the section through which the lubrication liquid flows, advantageously serving to limit the flow rate of the lubrication liquid flowing through each distribution means.

For example, constriction means may be formed by a cone having an outlet section in the form of an orifice having a first diameter that is less than 1 millimeter (1 mm). The distribution means including such constriction means thus enable the lubrication liquid to flow at a low rate. This small outlet section in combination with the viscosity of the lubrication liquid typically makes it possible to have a lubrication liquid flow rate in the form of drops, with the frequency at which the drops appear being a function in particular of the dimensions of the outlet section of the constriction means, of the height of the column of lubrication liquid situated above the distribution means, and of the viscosity of the lubrication liquid.

Preferably, the distribution means include constriction means and a filter. The filter serves to filter the lubrication liquid in order to avoid plugging the constriction means.

Such distribution means take the place in particular of a spray nozzle that is conventionally used in main or emergency lubrication means for the purpose of spreading a mechanically-pressurized lubrication liquid.

Each distribution means of the emergency lubrication device of the invention advantageously has no moving parts, thereby greatly limiting any risk of malfunction of the emergency lubrication device, and thus improving its reliability. Furthermore, such distribution means weighs the same or even less than a spray nozzle as conventionally used on main or emergency lubrication means.

Each distribution means of the emergency lubrication device of the invention is arranged over rotary or transmission elements of the mechanical system and in the proximity of an essential member of the mechanical system in order to cool that essential member.

The lubrication liquid flows from the tank to the distribution means through pipes of the emergency lubrication device of the invention.

The trigger means for putting the emergency lubrication device of the invention into operation may include a plurality of first valves. The first valves may be positioned level with each distribution means. Such an arrangement of the first valves presents the advantage of lubricating the mechanical system as soon as the trigger means are actuated. Specifically, since the first valves are positioned level with each distribution means, the pipes in the proximity of these distribution means are filled with lubrication liquid that then flows in each distribution means as soon as the trigger means controlling the opening of the first valves are activated. The mechanical system is thus lubricated as soon as the malfunction of the main lubrication means is detected.

In contrast, the emergency lubrication device of the invention then has a plurality of first valves, thus increasing both the weight and the cost of the emergency lubrication device.

Preferably, the trigger means of the emergency lubrication device have only one single first valve enabling the tank to be put into communication with each of the pipes. By way of example, this first valve may be arranged directly at the outlet from the tank. Under such circumstances, as soon as the trigger means are activated, as a result of detecting a malfunction of the main lubrication means of the mechanical system, liquid fills the pipes and reaches the distribution means after a start-up time. This start-up time is nevertheless short, being of the order of a few seconds. The start-up time thus does not degrade the emergency lubrication device of the invention for lubricating and cooling the mechanical system. Such trigger means having only one first valve thus advantageously make it possible to minimize the weight and the cost of the emergency lubrication device of the invention.

The trigger means may also include a second valve for venting the tank. The second valve is necessary when the tank is closed and leaktight in order to enable the lubrication liquid to leave the tank and allow air to enter into the tank.

Each first valve and each second valve of the trigger means may be reversible valves suitable for being opened and closed several times. Such a reversible valve presents the advantage of making it possible to stop feeding the distribution means and lubricating the mechanical system after detecting a malfunction of the main lubrication means and activating the trigger means. Stopping the feed of the distribution means serves to stop the lubrication liquid that remains in the tank from flowing out, e.g. in the event of the mechanical system being stopped or indeed because the malfunction of the main lubrication means has disappeared.

Preferably, each first valve and each second valve is a valve suitable for use once only. Such a valve that is suitable for use once only presents the advantage of being extremely reliable, in particular compared with a reversible valve. Furthermore, the quantity of lubrication liquid in the tank is limited, and enables the mechanical system to be lubricated and cooled for only a limited duration. Consequently, the emergency lubrication device of the invention gives precedence to reliability over losing part of a limited quantity of lubrication liquid. Furthermore and by way of example, failure of an emergency lubrication device to operate as a result of a valve failing can be catastrophic if the mechanical system is a power transmission main gearbox of a rotary wing aircraft, and if the malfunction of the main lubrication means appears while the aircraft is in flight.

Furthermore, when the trigger means have only one first valve, the first valve and the second valve can be grouped together as a single component, advantageously enabling single control means to actuate opening of both of these valves.

The trigger means are preferably under pyrotechnic control in order to control opening of the first valve and of the second valve, thereby enabling lubrication liquid to flow from the tank to the distribution means via the pipes. Such pyrotechnic control presents the advantages of being extremely reliable, lightweight, and of very low maintenance cost. Specifically, the operation of a pyrotechnic control is generally guaranteed for a lifetime lying in the range 10 years to 20 years.

The triggering of the pyrotechnic control may be electrical or thermal. By way of example, the pyrotechnic control may be triggered electrically in conventional manner by detecting a malfunction of the main lubrication means of the mechanical system.

Thermal triggering of the pyrotechnic control is obtained advantageously as a result of the increase in the temperature of the mechanical system. The trigger means and the tank are then located inside the mechanical system. In the event of the main lubrication means malfunctioning, the temperature of the mechanical system increases as a result of the lubrication and cooling by the main lubrication means coming to a stop. As soon as the temperature of the trigger means situated inside the mechanical system reaches a predetermined threshold, the pyrotechnic control is triggered, thereby enabling the lubrication liquid to flow from the tank to the distribution means via the pipes. The value of this predetermined threshold may be about 150° C., for example.

Such thermal triggering of the pyrotechnic control advantageously avoids using means for detecting malfunction of the main lubrication means, where such detector means may themselves be the subject of malfunction, thereby increasing the reliability of the emergency lubrication device of the invention.

The trigger means may also be completely under electrical control for opening the first valve and opening the second valve as a result of means for detecting a malfunction of the main lubrication means of the mechanical system.

Furthermore, each distribution means is arranged inside the mechanical system and each pipe feeding each distribution means is arranged at least in part inside the mechanical system.

After a malfunction of the main lubrication means with lubrication and cooling being stopped, the temperature of the mechanical system increases.

This temperature increases firstly as a result of the start-up time of the emergency lubrication device between the main lubrication means stopping and the instant at which the emergency lubrication means does indeed lubricate the essential members of the mechanical system, and secondly because the lubrication and the cooling performed by the emergency lubrication device are less effective than the lubrication and the cooling performed by the main lubrication means. As a general rule, the emergency lubrication device does not lubricate all of the rotary elements and transmission elements in the mechanical system, but only the essential members, and the flow rate of the lubrication liquid is smaller from an emergency lubrication device than from main lubrication means.

By way of example, the temperature of the mechanical system may increase from a nominal temperature of about 80° C. up to a maximum temperature of about 150° C. in certain zones of the mechanical system.

Thus, following a malfunction of the main lubrication means of the mechanical system and activation of the trigger means of the emergency lubrication device, lubrication liquid flows in each pipe and in each distribution means. This lubrication liquid is then heated progressively by the mechanical system, and consequently the viscosity of the lubrication liquid decreases progressively.

As it lubricates the essential members of the mechanical system, the tank becomes progressively emptied of the lubrication liquid that it contains. Furthermore, the lubrication liquid flows under the action of terrestrial gravity. Consequently, the flow rate of the lubrication liquid leaving distribution means is a function in particular both of the height of the column of lubrication liquid situated above the distribution means and also of the viscosity of the lubrication liquid.

Advantageously, the drop in the viscosity of the lubrication liquid has the effect of increasing the flow rate of the lubrication liquid, thereby making it possible to compensate at least for the drop in the height of the lubrication liquid column, which drop in column height leads to a drop in flow rate. As a result, the flow rate of the lubrication liquid through each distribution means is substantially constant, or even increases progressively, while the emergency lubrication device is in operation and so long as the tank contains lubrication liquid.

Thus, the flow rate of the lubrication liquid through each distribution means is substantially equal to or greater than a minimum flow rate so long as the tank contains lubrication liquid. For any one distribution means, the minimum flow rate is equal to the flow rate of the lubrication liquid through the distribution means when the emergency lubrication device starts operating.

For the emergency lubrication device as a whole, the minimum flow rate is equal to the lowest flow rate of the lubrication liquid through the distribution means when the emergency lubrication device starts. The ambient temperature and the first diameter of the constriction means, in particular, both have an influence on the flow rate of the distribution means. This minimum flow rate may be of the order of 0.2 liters per hour (0.2 L/h), for example.

In order to encourage the viscosity of the lubrication liquid to drop, the distribution means are preferably placed in a zone of the mechanical system that is subjected to a significant increase in temperature while the emergency lubrication device is in operation. Advantageously, the distribution means are arranged over rotary elements and transmission elements of the mechanical system and in the proximity of an essential member. Specifically, following a failure of the main lubrication means, the essential member is no longer lubricated or is lubricated insufficiently, so it becomes hotter and consequently heats up the distribution means by thermal conduction and in particular heats up the constriction means that it includes. The lubrication liquid contained by the constriction means and the distribution means is then heated, so its viscosity decreases. The flow rate of this lubrication liquid is thus increased and the lubrication liquid flows over a zone in the proximity of the essential member. As a result, the emergency lubrication device of the invention enables this zone to be lubricated and cooled, and by thermal conduction it also cools the essential member so as to limit or even avoid damage to the essential member.

Furthermore, the distribution means may be arranged higher than and vertically above an essential member so that the lubrication liquid flows directly onto the essential member and thus cools and lubricates the essential member.

Furthermore, in order to contribute to the flow rate of the lubrication liquid being substantially equal to or greater than the minimum flow rate, it is preferable for the pipes of the emergency lubrication device to be of dimensions that make it possible firstly to limit head losses in the lubrication liquid flowing through those pipes, and secondly to encourage raising the temperature of the lubrication liquid, thereby lowering its viscosity. Limiting head losses in this way in the lubrication liquid is necessary mainly when the lubrication liquid still has considerable viscosity, i.e. during the first instants in which the emergency lubrication device is in use. Thereafter, head losses decrease as the viscosity of the lubrication liquid decreases.

As a result, each pipe has a second inside diameter that is greater than or equal to a first minimum value in order to enable the lubrication liquid to be heated sufficiently. For example, the first minimum value lies in the range 6 mm to 10 mm.

Furthermore, the emergency lubrication device of the invention preferably includes a single first valve situated at the outlet from the tank. Specifically, the pipes and the distribution means do not contain any lubrication liquid until a malfunction of the main lubrication means is detected and the trigger means are activated. Consequently, there is no risk of the lubrication liquid coking in the pipes and the distribution means so long as the emergency lubrication device is not in operation.

Thereafter, when the emergency lubrication device is in operation and the lubrication liquid is flowing in the pipes and the distribution means, the action of the constriction means must not be too little so as to avoid generating a large amount of local heating in the lubrication liquid. Specifically, in the event of such considerable local heating of the lubrication liquid, it is possible that coking of the lubrication liquid might appear locally in the constriction means, thereby clogging the constriction means and consequently leading to malfunction of the emergency lubrication device of the invention.

As a result, each constriction means has an orifice having its first diameter greater than or equal to a second minimum value. For example, the second minimum value lies in the range 0.3 mm to 1.0 mm.

In addition, so long as the lubrication liquid is flowing in the pipes and the distribution means, the risk of coking appearing in the lubrication liquid is likewise reduced, since the lubrication liquid is moving.

Thus, the combination of appropriate sections, of constriction means, and of the absence of lubrication liquid in the pipes and the distribution means so long as the trigger means have not been activated, all contribute to limiting any risk of coking appearing in the lubrication liquid.

Nevertheless, it is appropriate to avoid positioning the distribution means in a zone of the mechanical system when the temperature is excessive, in order to limit the risk of coking appearing in the lubrication liquid.

Nevertheless, such an excessive temperature depends on the characteristics of the lubrication liquid that is used. By way of example, the excessive temperature may be about 200° C., or even higher if the lubrication liquid used is a high performance oil.

Furthermore, the tank may also be arranged inside the mechanical system. Specifically, all of the pipes are also arranged inside the mechanical system. Consequently, all of the lubrication liquid of the emergency lubrication device of the invention is subjected to the temperature increase of the mechanical system resulting from a malfunction of the main lubrication means.

Furthermore, the position and the shape of the tank and the position of the distribution means may have an influence on the flow rate of the lubrication liquid through each distribution means and on the way the flow rate varies.

The value of this flow rate depends in particular on the height of the column of lubrication liquid situated above each distribution means. This column of lubrication liquid is constituted by the sum of the height $H1$ of the lubrication liquid in the tank plus the distance $H21$, $H22$ between the tank and each distribution means, the height $H1$ and the distance $H21$, $H22$ being defined in the gravity direction.

Specifically, depending on the shape of the tank, the drop in the height $H1$ of lubrication liquid takes place more or less quickly. Consequently, variation in the flow rate through each distribution means can also take place more or less quickly. In particular, for a given volume of lubrication liquid, the smaller the height $H1$ before the trigger means are activated, the slower the drop in this height $H1$ while the mechanical system is being lubricated by the emergency lubrication device.

Nevertheless, the shape of the tank may be determined by the space available in the mechanical system when the tank is arranged inside the mechanical system.

In addition, the height $H1$ decreases while the emergency lubrication device is in operation, but the distance $H2$, $H22$ is constant. As a result, the distance $H21$, $H22$ is a dimensional value that is of importance in obtaining a flow rate through each distribution means that varies little regardless of the height $H1$. Specifically, the height $H1$ of the lubrication liquid in the tank is preferably less than the distance $H21$, $H22$ between the tank and each distribution means. The influence of variation in the height $H1$ on the flow rate of lubrication liquid through each distribution means is thus reduced.

Furthermore, and as mentioned above, the viscosity of the lubrication liquid decreases while the emergency lubrication device is in operation, and in combination with the reduced influence of variation in the height $H1$ on the flow rate of the lubrication liquid through each distribution means, this decrease in viscosity contributes to the flow rate through each distribution means being substantially equal to the minimum flow rate, or indeed greater than the minimum flow rate.

It may also be advantageous for the flow rate of the lubrication liquid to increase while the emergency lubrication device is in operation. Specifically, the effectiveness of the emergency lubrication device is less than that of the main lubrication device. As a result, the temperature of the mechanical system may continue to increase while the emergency lubrication device is in operation.

Thus, the increase in this flow rate while the emergency lubrication device is in operation enables lubrication of the mechanical system to be increased in parallel with the increase in temperature of the mechanical system.

Consequently, the height $H1$ and the distance $H21$, $H22$ are preferably defined initially so that the decrease in the height $H1$, while the emergency lubrication device is lubricating the mechanical system, and the decrease in the viscosity of the lubrication liquid make it possible, throughout the operation of the emergency lubrication device, to have a flow rate of the lubrication liquid through each distribution means that is substantially equal to the minimum flow rate, or indeed greater than the minimum flow rate.

The emergency lubrication device of the invention thus makes it possible to deliver a lubrication liquid flow rate that is at least substantially constant, and possibly increasing, this flow rate being provided by the height of the column of lubrication liquid, by making use of the increase in the temperature of the mechanical system that results from the failure of the main lubrication means for the purpose of improving the effectiveness of the emergency lubrication device.

The emergency lubrication device of the invention thus presents the advantage of great reliability, the architecture of the emergency lubrication device being simplified, in particular by eliminating the use of spray nozzles, of a pump, or of a pressurized tank, all of which can lead to dormant failures in such emergency lubrication devices as used conventionally. The only mechanical device of the emergency lubrication device of the invention is the trigger means, which is preferably an element suitable for use once only in order to guarantee its reliability.

This great reliability is essential for an emergency lubrication device, which must be absolutely certain of performing its function of lubricating essential members of the mechanical system following a stop of the main lubrication.

Furthermore, this simplified architecture for the emergency lubrication device of the invention also makes it possible to limit the weight and the cost of the emergency lubrication device.

Since, as a general rule, the emergency lubrication device is used very rarely during the lifetime of the mechanical system, it is important for it to be of limited weight, specifically in order to avoid penalizing the performance of the aircraft when the mechanical system forms part of an aircraft.

The present invention also provides a power transmission main gearbox for a rotary wing aircraft. The power transmission main gearbox is provided with an emergency lubrication device as described above.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which.

DETAILED DESCRIPTION OF THE INVENTION

Elements present in more than one of the figures are given the same references in each of them.

Figure 1:
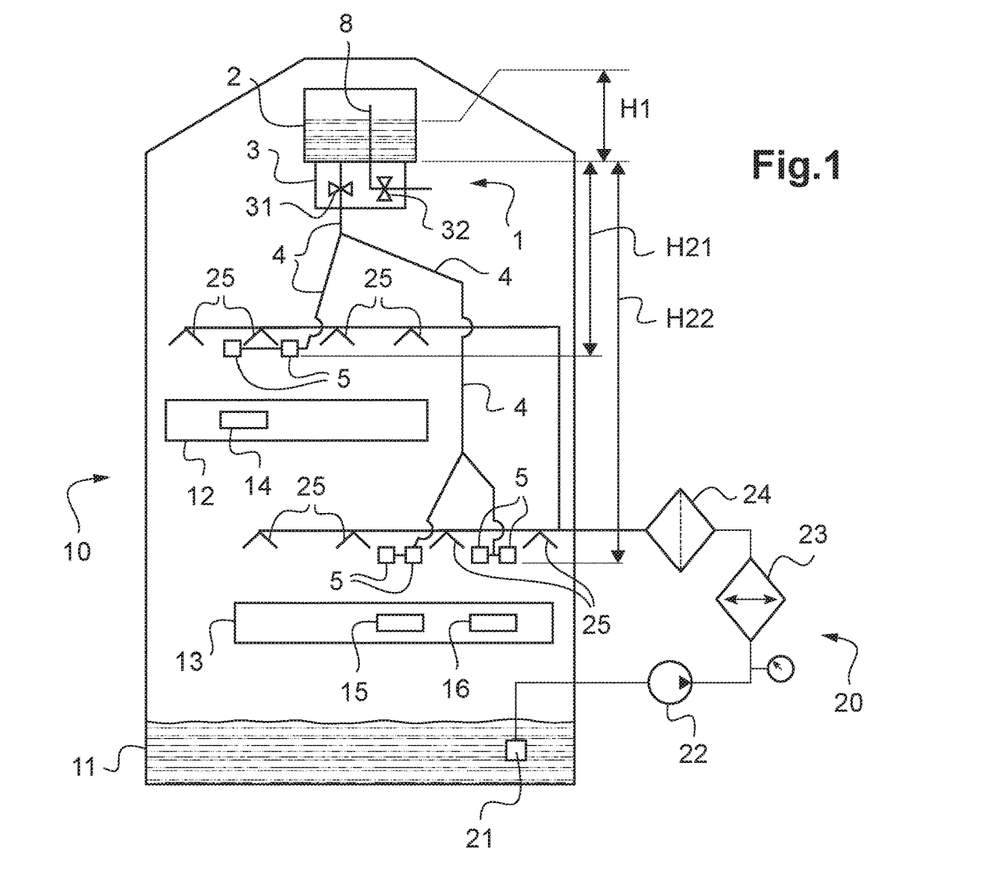
FIG. 1 shows a mechanical system including an emergency lubrication device of the invention.

A mechanical system 10 comprising both main lubrication means 20 and also an emergency lubrication device 1 is shown in FIG. 1. The mechanical system 10 includes in particular rotary elements 12, such as shafts and bearings, and power transmission elements 13 and speed increasing or decreasing elements, such as pinions and/or gears. The mechanical system 10 may for example be a power transmission main gearbox of a rotary wing aircraft.

The main lubrication means 20 and the emergency lubrication device 1 serve to lubricate and cool some or all of the mechanical elements 12, 13 in the mechanical system 10.

The main lubrication means 20 include a suction point 21, a pump 22, a heat exchanger 23, a filter 24, and spray nozzles 25. The spray nozzles 25 are positioned above the rotary elements 12 and the transmission elements 13. The pump 22 serves to suck up a lubrication liquid, such as oil, that is situated in a casing 11 of the mechanical system 10, and to spray it via the spray nozzles 25 onto the mechanical elements 12, 13. The main lubrication means 20 thus serve to lubricate and cool these mechanical elements 12, 13.

The emergency lubrication device 1 has a tank 2 containing lubrication liquid, trigger means 3, pipes 4, and distribution means 5. The emergency lubrication device 1 is arranged entirely inside the mechanical system 10, and the tank 2 is positioned above the pipes 4 and the distribution means 5. The trigger means 3 are situated at the outlet from the tank 2 and comprise two valves 31 and 32. Two distribution means 5 are positioned above first essential members 14 selected from the rotary elements 12, and two distribution means 5 are positioned respectively over second essential members 15, 16 selected from among the transmission elements 13.

The trigger means 3 allow lubrication liquid to flow between said tank 2 and each distribution means 5 in the event of a malfunction of the main lubrication means 20 being detected. For this purpose, the trigger means 3 comprise a first valve 31 arranged between the tank 2 and a first pipe 4, and a second valve 32 arranged in tubing 8. The tubing 8 serves to connect the inside of the tank 2 to the outside of the tank 2.

Thus, opening the second valve 32 serves to vent the tank 2. This venting of the tank 2 is essential to enable the lubrication liquid to flow into the first pipe 4 when the first valve 31 is opened, since the tank 2 is closed and leaktight. A closed and leaktight tank 2 avoids foreign bodies and dust intruding into the tank 2. A closed and leaktight tank 2 is also useful when the mechanical system 10 forms part of an aircraft. Specifically, the attitude of an aircraft can vary in flight, and in particular while turning. The lubrication liquid could then escape from the tank 2 if it had one or more openings serving to vent the tank 2 permanently.

Opening the first valve 31 allows the lubrication liquid to flow from the tank 2 into the first pipe 4 and then to each distribution means 5 via other pipes 4. This flow of the lubrication liquid is driven solely by the action of terrestrial gravity, the tank 2 not being pressurized, but being situated above the pipes 4 and the distribution means 5.

The first and second valves 31 and 32 are valves suitable for use once only. Such valves 31 and 32 that are usable once only present the advantages firstly of being extremely reliable and secondly of having a lifetime that is long, without operating and without any particular maintenance.

The opening of these first and second valves 31 and 32 is triggered simultaneously by activating the trigger means 3 as soon as a malfunction of the main lubrication means 20 is detected. This opening of the first and second valves 31 and 32 enables the lubrication liquid to flow from the tank 2 to the distribution means 5 via the pipes 4.

Activation of the trigger means 3 is under pyrotechnic control, with the pyrotechnic control being triggered thermally. Thus, the trigger means 3 are activated as soon as the ambient temperature of the trigger means 3 reaches a predetermined threshold. Since the emergency lubrication device 1 is located entirely inside the mechanical system 10, the ambient temperature of the trigger means 3 is substantially equal to the temperature of the mechanical system 10. Furthermore, after a malfunction of the main lubrication means 20, lubrication and cooling of the mechanical elements 12 and 13 are degraded or even interrupted. Consequently, the temperature of the mechanical system 10 increases after this lubrication and cooling of the mechanical elements 12 and 13 has become degraded or has been interrupted.

As a result, the trigger means 3 are activated as soon as the temperature of the mechanical system in the proximity of the trigger means 3 reaches a predetermined threshold, which is then characteristic of a malfunction of the main lubrication means 20.

The pyrotechnic control of the trigger means 3 may also be triggered electrically. Such electrical triggering of the pyrotechnic control can be obtained by using detector means (not shown) for detecting a malfunction of the main lubrication means 20. By way of example, the detector means may serve to detect a drop in the pressure of the lubrication liquid in the main lubrication means 20, or indeed a drop in the level of lubrication liquid in the casing 11 of the mechanical system 10.

Furthermore, the trigger means 3 may also be totally under electrical control, in which case it also uses such detector means for detecting a malfunction of the main lubrication means 20.

Figure 2:
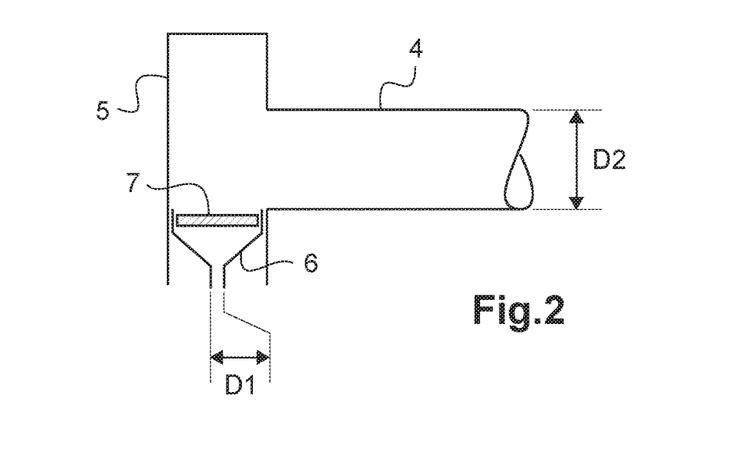
FIG. 2 is a section view of distribution means of the emergency lubrication device.

A section view of distribution means 5 is given in FIG. 2. The distribution means 5 comprise constriction means 6 and a filter 7. Constriction means comprise a reduction in the dimensions of the section through which the lubrication liquid flows, serving advantageously to limit the flow rate of the lubrication liquid flowing through each of the distribution means 5.

The constriction means 6 are formed by a cone having an outlet section in the form of an orifice having a first diameter D1 that is small. The constriction means 6 serve to reduce the flow rate of the lubrication liquid leaving the distribution means 5. The filter 7 serves to filter the lubrication liquid entering the distribution means 5 via the pipe 4, in particular to avoid plugging the constriction means 6. This small first diameter D1 typically serves to provide a flow of lubrication liquid in the form of drops at the outlet from each distribution means 5.

Furthermore, the first diameter D1 is greater than or equal to a second minimum value in order to avoid generating large local heating of the lubrication liquid and consequently avoid coking the lubrication liquid. By way of example, the second minimum value may lie in the range 0.3 mm to 1.0 mm.

Furthermore, since the emergency lubrication device 1 is arranged entirely inside the mechanical system 10, all of the lubrication liquid in the tank 2 and the lubrication liquid flowing in the pipes 4 and the distribution means 5 is subjected to the increasing temperature of the mechanical system 10. This lubrication liquid is thus heated progressively, and as a result its viscosity diminishes progressively.

In addition, lubricating essential members 14, 15, and 16 leads to the level of lubrication liquid in the tank 2 lowering progressively. Consequently, the reduction in the height of the lubrication liquid column situated above each distribution means 5 also tends to reduce the value of the flow rate of the lubrication liquid leaving each distribution means 5.

Advantageously, the drop in the viscosity of the lubrication liquid as a result of the increase in the temperature of the mechanical system 10 serves to compensate for this reduction in the height of the lubrication liquid column and contributes to conserving a lubrication liquid flow rate that is at least substantially constant, and that might possibly even be increasing.

Furthermore, in FIG. 1, it can be seen that the height H1 of the lubrication liquid in the tank 2 is much less than the distances H21 and H22 between the tank 2 and the various distribution means 5, where the height H1 and the distances H21, H22 are defined in the gravity direction. As a result, a drop in the height H1 of the lubrication liquid in the tank 2 gives rise to only a very small reduction in the height of the column of lubrication liquid situated above each distribution means 5.

Consequently, the flow rate of the lubrication liquid through each distribution means 5 is substantially equal to or greater than a minimum flow rate while the emergency lubrication device 1 is in operation and so long as the tank 2 continues to contain lubrication liquid. For each distribution means 5, this minimum flow rate is equal to the flow rate of the lubrication liquid through the distribution means 5 at the time the emergency lubrication device 1 is started. By way of example, this minimum flow rate may be equal to 0.2 L/h.

Furthermore, in order to limit disturbances that might limit the flow rate of the lubrication liquid, the pipes 4 are of dimensions serving firstly to limit head losses in the lubrication liquid flowing in the pipes 4, and secondly to enhance the increase in the temperature of the lubrication liquid, and consequently reduce its viscosity. Each pipe 4 thus has a second inside diameter D2 that is greater than or equal to the first minimum value, e.g. lying in the range 6 mm to 10 mm.

The emergency lubrication device 1 thus has architecture that is simplified, without using a pump, spray nozzles, or a pressurized tank, and is thus also of small weight and cost. This small weight is important for this function that is used very rarely during the lifetime of the mechanical system 10, even though it is essential for the mechanical system 10 in the event of a malfunction of the main lubrication means 20. Furthermore, this simplified architecture provides great reliability to the emergency lubrication device 1.

Naturally, the present invention may be subjected to numerous variations as to its implementation. Although several embodiments are described, it can readily be understood that it is not conceivable to identify exhaustively all possible embodiments. It is naturally possible to envisage replacing any of the means described by equivalent means without going beyond the ambit of the present invention.

What is claimed is:

1. An emergency lubrication device of simplified architecture for a mechanical system, the emergency lubrication device being provided with a tank, trigger means, at least one pipe, and at least one distribution means, the tank containing a lubrication liquid, and the trigger means enabling the lubrication liquid to flow between the tank and each of the at least one distribution means in the event of a malfunction of a main lubrication means of the mechanical system being detected, the tank being spaced from and not fluidly connected to the main lubrication means, wherein the tank is arranged above each of the at least one pipe and each of the at least one distribution means so that the lubrication liquid flows under the action of terrestrial gravity from the tank into each pipe and each distribution means, each distribution means including at least one constriction means in order to limit the flow rate of the lubrication liquid through each distribution means and being arranged inside the mechanical system, each pipe feeding each distribution means being arranged at least in part inside the mechanical system, the lubrication liquid flowing in each pipe and in each distribution means thus being heated by the mechanical system and the viscosity of the lubrication liquid decreasing following a malfunction of the main lubrication means so that a flow rate of the lubrication liquid through each distribution means is substantially equal to or greater than a minimum flow rate so long as the tank contains the lubrication liquid.

2. The emergency lubrication device of claim 1, wherein the tank is arranged inside the mechanical system.

3. The emergency lubrication device of claim 1, wherein the height H1 of the lubrication liquid in the tank is less than the distance H21, H22 between the tank and each distribution means, the height H1 and the distance H21, H22 being defined in the gravity direction measured from a bottom of the tank upward for H1 and downward for H21 and H22.

4. The emergency lubrication device of claim 3, wherein the height H1 and the distance H21, H22 are initially defined so that the decrease in the height H1 while the emergency lubrication device is lubricating the mechanical system, and the decrease in the viscosity of the lubrication liquid, make it possible for the flow rate of the lubrication liquid through each distribution means to be substantially equal to or greater than the minimum flow rate so long as the tank contains the lubrication liquid.

5. The emergency lubrication device of claim 1, wherein the trigger means comprise a first valve enabling the tank to be put into communication with each pipe.

6. The emergency lubrication device of claim 1, wherein the trigger means comprise a plurality of first valves positioned in association with each distribution means.

7. The emergency lubrication device of claim 1, wherein the trigger means comprise a second valve for venting the tank, the tank being closed and leaktight.

8. The emergency lubrication device of claim 1, wherein each constriction means includes an orifice having a first diameter that is greater than or equal to a second minimum value in order to avoid coking the lubrication liquid.

9. The emergency lubrication device of claim 8, wherein the second minimum value lies in the range 0.3 mm to 1.0 mm.

10. The emergency lubrication device of claim 1, wherein each pipe has a second diameter that is greater than or equal to a first minimum value so as to enable the lubrication liquid to be heated sufficiently.

11. The emergency lubrication device of claim 10, wherein the first minimum value lies in the range 6 mm to 10 mm.

12. The emergency lubrication device of claim 1, wherein the minimum flow rate is equal to the lowest flow rate of the lubrication liquid through each distribution means on starting the emergency lubrication device.

13. The emergency lubrication device of claim 1, wherein the trigger means are under electrical control.

14. The emergency lubrication device of claim 1, wherein the trigger means are under pyrotechnic control.

15. The emergency lubrication device of claim 14, wherein the trigger means and the tank are located inside the mechanical system, and the pyrotechnic control is triggered thermally as soon as the temperature of the trigger means reaches a predetermined threshold.

16. A power transmission main gearbox for a rotary wing aircraft, wherein the main gearbox is provided with the emergency lubrication device of claim 1, the mechanical system being the main gearbox.

17. An emergency lubrication system comprising:
a tank configured to hold lubrication liquid for a mechanical system, the tank being disposed at a first height, the tank being spaced from and not fluidly connected to a main lubricant system;
a distribution portion including a constricting section, the distribution portion located inside the mechanical system and disposed at a second height below the first height; and
a pipe connecting the tank to the distribution portion and capable of directing lubrication liquid from the tank to the distribution portion by gravity, at least part of the pipe being located inside the mechanical system; and
a trigger having a closed position where lubrication liquid is blocked from entering the pipe during operation of the main lubricant system, and an open position where upon malfunction of the main lubricant system, lubrication liquid flows from the tank through the pipe to the distribution portion by gravity to be supplied to the mechanical system,
wherein, the distribution portion and the pipe are positioned such that the lubricant liquid is heated by the mechanical system as it flows through the pipe and distribution portion so that a flow rate of the lubrication liquid through the distribution portion is substantially equal to or greater than a minimum flow rate.

18. The emergency lubrication system of claim 17, wherein a height of the lubrication liquid in the tank, measured from the bottom of the tank upward toward a tank height, is less than a distance between the tank and the distribution portion.

19. The emergency lubrication system of claim 18, wherein the height and the distance are initially defined based on the tank height so that a decrease in the height while the emergency lubrication system is lubricating the mechanical system, and a decrease in viscosity of the lubrication liquid, increases the flow rate of the lubrication liquid through the distribution portion to be substantially equal to or greater than the minimum flow rate so long as the tank contains the lubrication liquid.

20. An emergency lubrication system comprising:
a tank configured to hold lubrication liquid for a mechanical system, the tank being disposed at a first height, the tank being spaced from and not fluidly connected to a main lubrication system;
a distribution portion including a constricting section, the distribution portion located inside the mechanical system and disposed at a second height below the first height; and
a pipe connecting the tank to the distribution portion and capable of directing lubrication liquid from the tank to the distribution portion by gravity, at least part of the pipe being located inside the mechanical system; and
a trigger enabling lubrication liquid to flow from the tank through the pipe to the distribution portion to be supplied to the mechanical system in the event of a malfunction of the main lubrication system being detected,
wherein, the distribution portion and the pipe are positioned to be heated by the mechanical system so that a flow rate of the lubrication liquid through each of the at least one distribution portions is substantially equal to or greater than a minimum flow rate.

* * * * *